3,320,214
MODIFIED POLYMETHYLENE HAVING SIDE CHAINS SUBSTITUTED BY SULFUR CONTAINING GROUPS
Charles John Pedersen, Salem, N.J., assignor to E. I. du Pont de Nemours and Company, Wilmington, Del., a corporation of Delaware
No Drawing. Filed Apr. 26, 1962, Ser. No. 190,260
13 Claims. (Cl. 260—66)

This invention relates to polymethylenes and, more particularly, it relates to modified polymethylenes having side-chains substituted by groups containing sulfur.

Chain-saturated hydrocarbon polymers are growing in commercial importance today for many applications, such as elastomers, thermoplastic molding compositions, fibers and the like. Many of these polymers, however, cannot be satisfactorily dyed, cured or modified and, therefore, their present and potential fields of use are seriously restricted.

It is an object of this invention to provide novel modified polymethylene polymers. A further object is to provide such polymers which can be treated with a wide variety of chain-extending or curing agents to give vulcanizates especially suitable for specialty applications. A still further object is to provide such polymers which, although modified to improve certain properties, show no loss of the desirable properties possessed by unmodified polymers. Other objects will appear hereinafter.

These and other objects are accomplished in accordance with this invention by a modified polymethylene wherein from about 5% to about 25% of the chain-carbon atoms have attached thereto side-chain radicals of the structure

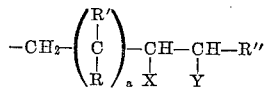

wherein: $a$ is an integer from 0 to 5 inclusive; R, R' and R'' are independently selected from the group consisting of hydrogen and lower alkyl radicals; X and Y are independently selected from the group consisting of —S—R''', —Cl, —Br, —I, and hydrogen wherein R''' is selected from the group consisting of hydrogen, monovalent organic radicals having a molecular weight less than 400 being unreactable with alkyl halides, and —S terminated side-chain radicals of the said structure attached to a modified polymethylene chain; with the proviso that only one of X and Y can be other than —S—R'''; and with the further proviso that the inherent viscosity of a 0.1% by weight solution of said modified polymethylene in tetrachloroethylene at 25° C. be at least 0.05.

The inclusion of chlorine, bromine and iodine within the definition of X and Y is dictated primarily by the method of preparation of the modified polymethylenes which will be explained in detail hereinafter. These halogens, however, if present at all in the product must be accompanied by the sulfur containing radicals enumerated above; their presence does not detract from the desirable properties of the polymer.

If the inherent viscosity of the polymer is below about 0.05, the polymer is generally too fluid for most purposes.

The scope of the term "lower alkyl" is not particularly critcal; however, the lower alkyl groups of methyl and ethyl are preferred.

The preferred method of preparing the modified polymethylenes of this invention involves the substitution of sulfur-containing groups for a replaceable substituent already on a polymer. Preferred starting materials are the chain-saturated hydrocarbon polymers having side-chain bromine. Suitable starting polymers include copolymers of ethylene and

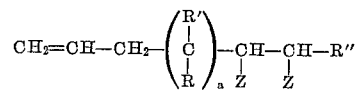

wherein R, R' and R'' can be hydrogen or lower alkyl; $a$ is an integer preferably from 0 to 5 inclusive; and Z is chlorine, bromine, iodine or hydrogen; however, only one Z may be hydrogen. Preferably, at least one Z will be bromine and suitable monomers include 4-bromo-1-butene, 5-bromo-1-pentene, 7-bromo-1-heptene, 9-bromo-1-nonene, 11-bromo-1-hendecene, 13-bromo-1-tridecene, 15-bromo-1-pentadecene, 12-bromomethyl-1-tridecene, 5-bromo-1-hexene, 4,5-dibromo-1-hexene, and 5,6-dibromo-1-hexene. Representative examples of other halogenated olefins include 4-chloro-1-butene, 5-chloro-1-pentene, 6-chloro-1-hexene, 11-chloro-1-hendecene, 11-iodo-1-hendecene, 4-chloro-1-pentene, 4-chloro-1-hexene, 5-chloro-1-hexene, 5-iodo-1-hexene, and 5,5,5-trichloro-1-pentene.

The starting copolymers may also contain monomer units of other unsaturated hydrocarbon monomers capable of being polymerized with a coordination catalyst. Examples of such monomers are: (a) alpha monoolefins of the structure R—CH=CH$_2$ where R is C$_1$–C$_{16}$ alkyl; (b) one or more non-conjugated hydrocarbon dienes. Representative examples of dienes include dicyclopentadiene, 5-methylene-2-norbornene, a 5-alkenyl-2-norbornene, a 2-alkyl-2,5-norbornadiene, and an open-chain non-conjugated diene having the structure

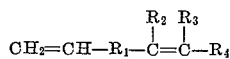

wherein R$_1$ as an alkylene radical, R$_2$ and R$_3$ are independently selected from the group consisting of hydrogen and alkyl radicals and R$_4$ is an alkyl radical and wherein R$_1$ to R$_4$ are so selected that the diene has from about 6–22 carbon atoms.

The above monomers may be polymerized in an inert solvent solution, e.g., methylene chloride, at temperatures from —10° C. to 25° C. in the presence of a coordination catalyst system, e.g., vanadium tris(acetylacetonate) with diisobutyl aluminum chloride with a molar ratio of aluminum to vanadium of about 9:1. The concentration of vanadium salt in the copolymerization reaction zone is about 0.00005 to 0.005 mole/liter.

Representative examples of the bromine-containing copolymers useful in making the modified polymethylenes of the present invention include ethylene/5-bromo-1-pentene,
ethylene/propylene/5-bromo-1-pentene,
ethylene/15-bromo-1-pentadecene,
ethylene/6-methyl-1-heptene/5,6-dibromo-1-hexene,
ethylene/15-ethyl-1,15-heptadecadiene/4-bromo-1-butene,
ethylene/dicyclopentadiene/5,6-dibromo-1-hexene,
ethylene/4,4,5,5-tetrabromo-1-hexene,
ethylene/12-bromomethyl-1-tridecene,
ethylene/5-(1'-propenyl)-2-norbornene/9-bromo-1-nonene,
ethylene/2-ethyl-norbornadiene/5-bromo-1-pentene,
ethylene/13-bromo-1-tridecene,
ethylene/4,5-dibromo-1-hexene,
ethylene/5,6-dibromo-1-hexene.

The copolymers containing side-chain bromine can also be made by adding bromine or hydrogen bromide to the side-chain carbon-carbon double bonds of ethylene/non-conjugated hydrocarbon diene copolymers which, in turn, can be made using the hydrocarbon dienes and the polymerization procedures heretofore described.

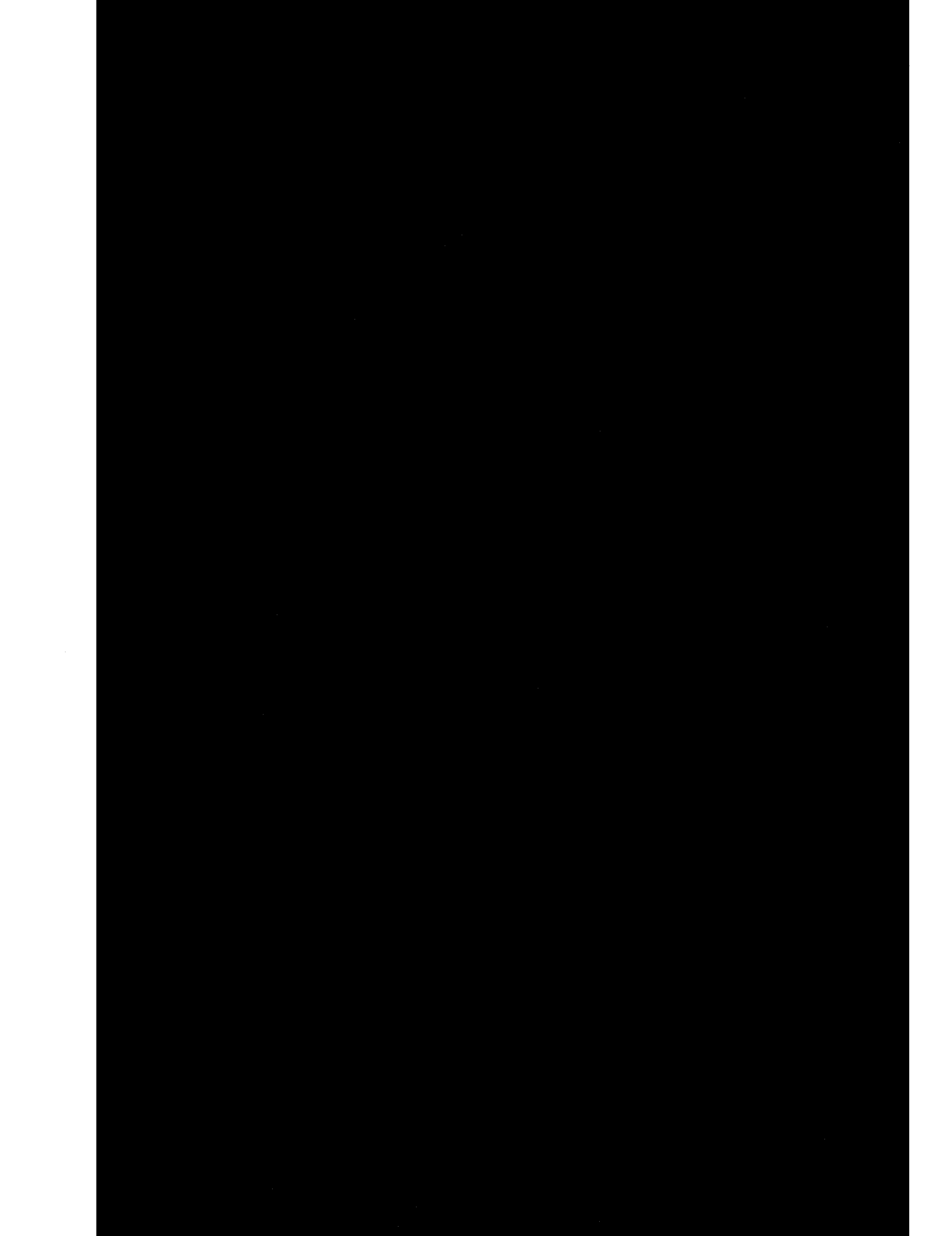

The copolymer displays the following behavior in solvents at 26° C.

*Swelling behavior*

| Solvent: | Percent vol. increase |
|---|---|
| Benzene | 108 |
| Methanol | 25 |
| Acetone | 28 |

EXAMPLE II

An ethylene/5-bromo-1-hexene copolymer is selected which contains 28.2% by weight bromine and exhibits an inherent viscosity of 0.37–0.39 (based on a 0.1% by weight solution in toluene at 30° C.). 4.3 grams of this copolymer (containing 1.21 grams of bromine), 100 ml. of toluene, 50 ml. of xylene, 3.1 grams (0.031 gram-mole) of 2-mercaptoimidazoline and 22 ml. of tetramethylene sulfone are added to the reactor of Example I and agitated under a nitrogen atmosphere for about 60 minutes at 121.5–122° C. The clear light yellow solution is concentrated under vacuum thereafter while agitated to remove the toluene and xylene. After 500 ml. of water and 3 drops of concentrated hydrochloric acid have been added to the residue, the milky aqueous phase is decanted. The flask is filled with 1 liter of water containing 2 drops of concentrated hydrochloric acid. The organic solid which separates is isolated and dried in a vacuum oven at 40° C. to give 3 grams of a sticky white elastomer. This copolymer analyzes for 1.8% sulfur, 1.2% nitrogen, and 25.3% bromine, corresponding to the following side-chain distribution per 100 chain-carbon atoms:

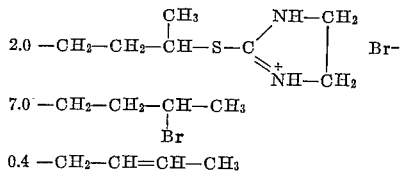

The

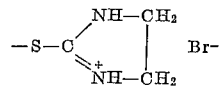

group concentration in the copolymer is 12.9% by weight or 0.71 gram-mole/kilogram.

EXAMPLE III

The following composition is agitated in the reactor of Example I under nitrogen at atmospheric pressure at 123–124° C. for 30 minutes: 2.28 grams (0.028 gram-mole) of potassium mercaptoacetate in 13 ml. of tetramethylene sulfone, 100 ml. of toluene, 2 grams (0.0260 gram-mole) of mercaptoacetic acid, and 5.68 grams (1.56 grams or 0.015 gram-atom of bromine) of the ethylene/5-bromo-1-pentene/1,4-hexadiene copolymer of Example I in 116 ml. of xylene. The organic solution is decanted from the precipitated potassium bromide and concentrated, while agitated, under vacuum at 60° C. After the concentrate has been stirred into 250 ml. of 95% ethanol, the liquid phase is decanted and introduced into 250 ml. of 95% ethanol; the resulting mixture is then allowed to stand overnight. The liquid phase which separates is decanted and the residual solid is added to 200 ml. of benzene at 80° C.; the resulting solution is filtered through coarse paper, the filtrate being concentrated while agitated under vacuum. The viscous solution obtained is poured into methanol. The coagulated modified copolymer is filtered off, thoroughly washed with acetone, and dried at 40° C. in a vacuum oven. There are obtained 4.5 grams of an orange, soft but not sticky, elastomer containing 9.2% sulfur and 10.3% bromine. This analysis corresponds to the following distribution of side-chains per 100 chain-carbon atoms:

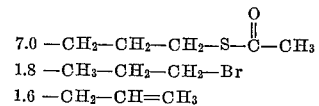

The

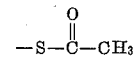

group concentration in the copolymer is 20.9% by weight or 2.79 gram-moles/kilogram.

The copolymer exhibits an inherent viscosity (based on a 0.1% by weight solution in toluene at 30° C.) of 1.02.

EXAMPLE IV

An ethylene/5-bromo-1-pentene/1,4-hexadiene copolymer is employed which contains 24% bromine (0.021 gram-atom), 44.9% by weight ethylene monomer units, 44.7% by weight 5-bromo-1-pentene monomer units, and 5.4% by weight 1,4-hexadiene monomer units; the polymer exhibits an inherent viscosity of 0.86 (0.1% by weight solution in tetrachloroethylene at 30° C.). A solution is made by dissolving 10.3 grams of this elastomer in 100 ml. of toluene.

To the flask of Example I are added 2.5 ml. (2.8 grams, 0.036 gram-mole) of 2-mercaptoethanol, 55 ml. of tetramethylene sulfone, and 2.05 grams of 85% potassium hydroxide (0.031 gram-mole) and 5 ml. of water. After 100 ml. of xylene have been introduced, the resulting composition is stirred and refluxed at atmospheric pressure at 125° C. About 5 ml. of water are distilled out. Then 10.3 grams of the above-described copolymer (in 100 ml. of toluene) and 175 ml. of xylene are added. The resulting mixture is agitated and heated and 100 ml. of distillate are collected. The remaining mixture is then agitated at reflux at 132–134° C. for 2.5 hours. After the resulting composition has been cooled to 90° C., 100 ml. of benzene and 250 ml. of water are added to dissolve the KBr. The resulting emulsion is poured into 1 liter of 95% ethanol and the precipitated copolymer is filtered off and dried in a vacuum oven at 40° C. There are obtained 8.6 grams of a tough, yellow elastomer containing 0.1% bromine and 9.6% sulfur. The analysis corresponds to the following distribution of side-chains per 100 chain-carbon atoms:

7.6% —CH$_2$—CH$_2$—CH$_2$—S—CH$_2$—CH$_2$—OH
1.7% —CH$_2$—CH=CH—CH$_3$

The 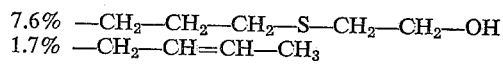 group concentration in the copolymer is 23.0% by weight or 2.99 gram-moles/kilogram.

This gelled copolymer exhibits a volume swell of 10% in water and 113% in benzene, both measurements being made at 90° C.

EXAMPLE V

An ethylene/5-bromo-1-pentene copolymer is selected containing 56.8% by weight ethylene monomer units, and 43.2% 5-bromo-1-pentene monomer units by weight.

A solution of 1.4 grams of the copolymer (containing 0.00414 gram-atom of bromine) in 50 ml. of xylene is agitated at reflux under nitrogen at atmospheric pressure in the equipment of Example I with 10 ml. of tetramethylene sulfone and 1.22 grams of C$_{12}$H$_{25}$—SK (0.0051 gram-mole). The reaction temperature is about 142–144° C. and after about 132 minutes the heat is shut off and the mixture allowed to cool. When the temperature falls to about 80° C., 100 ml. of benzene are introduced. The resulting mixture is filtered to remove KBr, the filtrate being treated with methanol to precipitate the copolymer. The precipitated copolymer is vacuum dried at 60° C. for 16 hours to give 0.77 gram of a white soft elastomer containing 1.1% bromine and 6.7–6.8 sulfur. This corresponds to the following side-chain distribution for each 100 chain-carbon atoms:

6.2 —CH₂—CH₂—CH₂—S—(n—C₁₂—H₂₅)
0.3 —CH₂—CH₂—CH₂—Br

The —S—(n—C₁₂H₂₅) group content in the copolymer is 42.2% by weight or 2.1 gram-moles/kilogram.

EXAMPLE VI

An ethylene/5-bromo-1-pentene/1,4-hexadiene copolymer is employed which contains 22–26% by weight bromine and has inherent viscosity (0.1% by weight solution in toluene at 30° C.) of 0.8–1.2; the polymer contains 51.8% by weight ethylene monomer units, 43.2% by weight of 5-bromo-1-pentene and 5% by weight of 1,4-hexadiene monomer units.

About 15 grams of the ethylene copolymer are dissolved in 250 ml. of xylene with heat and a 150 ml. portion of xylene is added. This solution is introduced into a 1-liter reactor and the following reagents are added: 13.2 grams (0.55 gram-mole) of C₁₂H₂₅—SK and 80 ml. of tetramethylene sulfone. The composition thereby formed is agitated at reflux at atmospheric pressure under a nitrogen atmosphere at 139.5–144° C. for 2 hours. It is then cooled to about 80° C. and 300 ml. of benzene and 5 grams of Celite are added. The resulting mixture is filtered to remove KBr and the filtrate is concentrated while agitated under vacuum until tetramethylene sulfone separates. The polymer is washed with 200 ml. of cold benzene and 200 ml. of petroleum ether and dried under reduced pressure while agitated. The copolymer obtained is redissolved in 200 ml. of benzene at 80° C. and poured into 1000 ml. of methanol. The reprecipitated copolymer is then washed with 400 ml. of methanol. The stringy copolymer is cut up and dried in a vacuum oven at 40° C. for 16 hours. There are obtained 14.7 grams of copolymer containing 0.92–0.93% bromine and 6.6% sulfur. This corresponds to the following side-chain distribution per 100 chain-carbon atoms:

6.3 —CH₂—CH₂—CH₂—S(n—C₁₂H₂₅)
0.3 —CH₂—CH₂—CH₂—Br
1.4 —CH₂—CH═CH—CH₃

The —S—(n—C₁₂—H₂₅) group concentration in the copolymer is 2.06 gram-moles/kilogram and the inherent viscosity (0.1% by weight solution in toluene at 30° C.) of the polymer is 1.09. The water swell of the raw elastomer is about 10% after 4 hours at 90° C.

This copolymer is then compounded on a rubber roll mill according to the following recipe (parts are by weight):

| | |
|---|---|
| Copolymer | 100 |
| N-phenyl-β-naphthylamine | 1 |
| Superabrasion furnace black | 40 |
| Zinc oxide | 5 |
| Stearic acid | 1 |
| Tellurium diethyldithiocarbamate | 1.5 |
| Tetramethylthiuram disulfide | 0.75 |
| Sulfur | 0.5 |

This stock was heated in a mold for 60 minutes at 160° C. The vulcanizate thereby obtained displays the following properties at 25° C.:

| | |
|---|---|
| Tensile strength _____p.s.i__ | 660–664 |
| Modulus₁₀₀ _____p.s.i__ | 550–566 |
| Elongation at the break _____percent__ | 190–200 |
| Permanent set | 1.38–1.40 |

EXAMPLE VII

Two grams (0.0247 gram-mole) of sodium thiocyanate, 30 ml. of tetramethylene sulfone, 3.4 grams of the ethylene copolymer of Example IV (containing 0.01 gram-atom of bromine) in 39 ml. of toluene, and 150 ml. of xylene are heated at atmospheric pressure under a nitrogen atmosphere. A sufficient amount of distillate is taken off to raise the pot temperature to 130° C. and the reflux is continued at 130–131.5° C. for 2 hours; the mass is then cooled and filtered. The filtrate is concentrated while agitated under vacuum until only the tetramethylene sulfone and the modified polymer are left. After 300 ml. of water are added to dissolve the NaBr, the copolymer is filtered off using a Buchner funnel without a paper. The copolymer is washed with acetone and finally dried in a vacuum oven at 40° C. The product obtained is an off-white elastomer which weighs 2.9 grams, and contains 3.52–3.53% nitrogen, 8.3% sulfur, and 4.0% bromine. This corresponds to the following side-chain distribution per 100 chain-carbon atoms:

6.4 —CH₂—CH₂—CH₂—S—CN
1.2 —CH₂—CH₂—CH₂—Br
1.7 —CH₂—CH═CH—CH₃

The —SCN group concentration in the polymer is about 15.6% or 2.69 gram-moles/kilogram. The copolymer exhibits an inherent viscosity (0.1% by weight in toluene at 30° C.) of 0.82 and the water swell of the raw polymer is about 9%. The elastomer forms films easily.

EXAMPLE VIII

An ethylene/5-bromo-1-pentene/1,4-hexadiene copolymer is selected containing 46.6% by weight ethylene monomer units, 48.4% by weight 5-bromo-1-pentene monomer units, and 5% by weight 1,4-hexadiene monomer units which exhibits an inherent viscosity (0.1% by weight solution in toluene at 30° C.) of 0.80. A solution of this copolymer is prepared by dissolving 25 grams in 500 ml. of xylene. 10.4 grams (0.046 gram-mole) of 88% thiosorbitol are reacted with 3.03 grams (0.056 gram-mole) of 85% potassium hydroxide in 5 ml. of water in the presence of 130 ml. of xylene; the composition is heated to reflux and about 7 ml. of water are distilled off. To this mixture are added 67 ml. of tetramethylene sulfone and half of the xylene solution of copolymer prepared above. The resulting composition is then refluxed at 141° C. under nitrogen at atmospheric pressure. After 1 hour 57 ml. of tetramethylene sulfone are introduced and reflux is continued for 25 minutes. The heat is then shut off and the mixture allowed to cool. The charge is filtered to remove potassium bromide and the filtrate is concentrated under reduced pressure while agitated to give 12.3 grams of a dull white gel polymer having 3.7, 3.8% sulfur, 65.4–65.7% carbon and 10.4% hydrogen. These analyses correspond to the following distribution of side-chains per 100 chain-carbon atoms:

3.7 —CH₂—CH₂—CH₂—S—CH₂—(CHOH)₄—CH₂OH
4.2 —CH₂—CH₂—CH₂—Br
1.5 —CH₂—CH═CH—CH₃

The —S—CH₂—(CHOH)₄—CH₂OH concentration in the copolymer is 1.19 gram-moles/kilogram. At 25° C., the benzene and water swell of this copolymer are 92% and 6%, respectively. The water swell at 98° C. is 77% after 4 hours.

EXAMPLE IX

An ethylene/5-bromo-1-pentene/1,4-hexadiene copolymer is selected having 43.6% by weight ethylene monomer units, 51.2% by weight 5-bromo-1-pentene monomer units, and 5.2% by weight 1,4-hexadiene monomer units which exhibits an inherent viscosity (0.1% by weight solution in toluene at 30° C.) of 0.79.

Into a 500 ml. flask there are introduced 0.392 gram of sodium hydroxide in 10 ml. of water and 7 ml. of ethyl mercaptoacetate in 150 ml. of benzene; after about 10 ml. of water has been distilled off a solution of 2.84 grams of the above copolymer (containing 0.0098 gram-atom of bromine) in 50 ml. of xylene and 50 ml. of peroxide-free cumene are added. After sufficient benzene has been distilled off to raise the pot temperature to 144° C., the composition is stirred at 144° C. at atmospheric pressure under a nitrogen atmosphere for 30 minutes. Thereafter, the composition is cooled and concentrated, while stirred, under vacuum at 60° C. A mixture of the residue with 250 ml. of methanol is allowed to stand at room temperature (20–30° C.) for about 18 hours. The curdy white copolymer particles which precipitate are filtered off, washed thoroughly with methanol (56° C.), and finally dried in a vacuum oven at 40° C. for 16 hours. The dry product obtained is an elastomer weighing 3.4 grams and containing 6.7–6.9% bromine and 9.3–9.4% sulfur. This corresponds to the following side-chain distribution per 100 chain-carbon atoms:

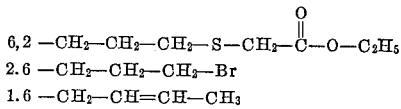

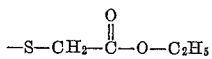

The

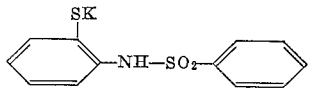

group concentration in the copolymer is 2.20 gram-moles/kilogram. Films are made from this white elastomer and are heated for 20 minutes at about 650° C. with methanol and potassium hydroxide; the carboxyl-substituted side-chains resulting enables the copolymer to be dyed with methylene blue and to coordinate with cupric ion.

EXAMPLE X

A solution prepared from 12.5 grams of the copolymer of Example VI and 330 ml. of xylene are added to a solution of 13.9 grams of

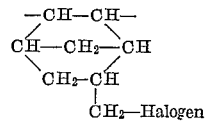

(0.046 gram-mole) in 67 ml. of tetramethylene sulfone under a nitrogen atmosphere in a 2-liter flask at 60° C. After the temperature is raised to 141° C. over a period of 25 minutes while agitation is maintained, the mixture is heated at reflux at atmospheric pressure under nitrogen for 60 minutes and the mixture then coagulates. Heating is stopped and the mixture is allowed to cool for a short time. Then it is stirred with 500 ml. of water to dissolve the KBr. The organic phase decanted is a gelatinous mass which is then warmed with 1-liter of water on a steam bath, and 5 ml. of acetic acid are added. The supernatant liquid phase is decanted and the copolymer is washed with 95% ethanol. The copolymer is then warmed on a steam bath with 1-liter of 95% ethanol, and concentrated while stirring under vacuum. The dry copolymer weighs 17 grams and analyses for 8.2% sulfur, 1.8% nitrogen, and 11.2% bromine. This corresponds to the following side-chain distribution per 100 chain-carbon atoms:

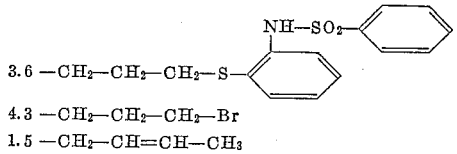

The

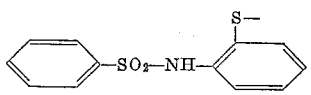

group concentration in the copolymer is 1.28 gram-moles/kilogram.

The grayish tough elastomer exhibits a benzene swell of 175% at 25° C. and 231% at 60° C. The water swell is 82% at 25° C. and 327% at 98° C. (In all cases the exposure times are 4 hours.)

If, in the above examples, an alkali salt of an oxygen-containing compound is used instead of an alkali mercaptan on the bromine-containing polymers, a side-chain will be formed having an —O— linkage instead of the —S— linkage. For example, if the sodium salt of 2,4-dihydroxybenzophenone is reacted with the copolymer of Example I, a modified polymer is obtained having about 5.4 of the following side-chain groups per 100 chain-carbon atoms:

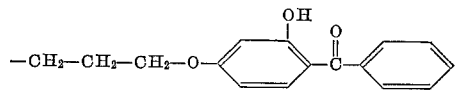

If the staring copolymer contains units of the formula

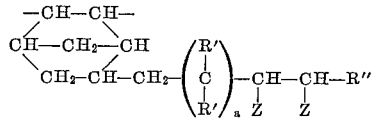

or wherein R, R' and R" are hydrogen or lower alkyl; $a$ is an integer preferably from 0 to 5 inclusive; and Z is halogen or hydrogen; however, only one Z may be hydrogen;

the substitution reaction takes place at one or both halogens and modified polymethylenes are obtained having properties similar to those described above.

The modified polymethylene products of the present invention range in character from stiff "plastics" to soft elastomers. The products which have a moderate proportion of side-chain groups can be elastomeric in nature. The side-chain substituents present in the novel modified polymethylenes give them a flexibility in curing procedures not possessed by the conventional α-olefin copolymers (e.g., ethylene/propylene copolymer or ethylene/propylene/1,4-hexadiene copolymers) or by the modified polymethylenes containing side-chain halogen (e.g., ethylene/5,6-dibromo-1-hexene/1,4-hexadiene copolymers). Furthermore, better adhesion, solvent resistance, dyeability, and valuable ion exchange properties are conferred by appropriate S, O, or N-containing substituents.

Those modified polymethylenes having sites which promote dyeability such as amino groups can be colored to give useful and aesthetically pleasing products. The modified polymethylene bearing side-chain amino, hydroxyl and mercapto groups can be further altered by reacting them with mono and polycarboxylic acids; the hydroxyl, amino, and mercapto and carboxyl-substituted modified polymethylenes of the present invention are broadly useful in curing polyisocyanate and polyisothiocyanate compositions. They can be reacted with monomeric organic diisocyanates, such as are described by Siefken (Ann. 562, 110–135 (1949)) or in U.S. Patents 2,728,727, 2,847,440, 2,865,940, 2,891,983, 2,963,504, 2,967,193, 2,978,476, and 2,986,576. They can also be reacted with NCO-terminated polyurethanes such as polyisocyanate-terminated polyesters (U.S. Patents 2,620,516, 2,621,166, 2,729,618; French Patent 1,201,467; Australian application 20,059/53); NCO-terminated polyalkyleneether polyurethanes (U.S. Patents 2,726,219, 2,850,461, 2,901,445, 2,901,467, 2,917,489, 2,929,800; British Patents 733,624, 794,044, 797,965); NCO-terminated polyalkyleneether-thioether glycols (U.S. Patent 2,917,489); NCO-terminated castor oil-epoxy resin condensation products (U.S. Patent 2,788,335).

They can be used to cure liquid NCO-terminated polyalkyleneether (or polyester) polymers for encapsulating electronic equipment and making molded solid articles, fibers for cloth, films for packaging applications, calks for sealing windows and masonry and boats, and protective coatings for floors and decks and the like. Cellular products useful for fabricating crash pads, topper pads, resilient cushions, rigid insulation panels, and the like, result when gas or a gas-forming agent is incorporated for expanding the liquid mixture prior to cure. Solutions of the polyisocyanate compositions in volatile inert liquid media can be applied to substrates such as wood, glass, or steel by conventional methods such as roll coating, swabbing or spraying. Furthermore, they can be made NCO-terminated when they are reacted with a molar excess of an organic polyisocyanate. The NCO-terminated modified polymethylenes resulting can be substituted for part or all of the above-described polyisocyanates for any of the applications heretofore described. Thus, they can be used as adhesives for joining metal, wood, and glass members, and for joining metal to neoprene; they can be empolyed to coat non-woven fabrics; they can be used to make cellular cushions, topper pads, and the like.

The HO modified polymethylenes can also be reacted with molar proportions of dicarboxylic acids or anhydrides or carboxyl-terminated polymers to make polyesters. They can be reacted with polyesters to make new polyesters by transesterification. The polyester products can be used to fabricate films for packaging applications, molded parts for machinery, fibers for clothing, etc.

The

modified polymethylenes can be used to make polyesters by transesterification with polyesters or with HO-modified polymethylenes or with polyols such as the monomeric polyols (e.g., ethylene glycol, trimethylolpropane) described in French Patent 1,246,584; and hydroxyl-terminated polymers such as hydroxyl-terminated polyhydrocarbons (U.S. Patent 2,877,212); fatty acid triglycerides (2,833,730 and 2,787,601), hydroxyl-terminated polyformals (U.S. Patent 2,870,097); hydroxyl-terminated polyesters (U.S. Patents 2,698,838; 2,921,915; 2,591,884; 2,866,762; 2,850,476; 2,602,783; 2,729,618; 2,779,689; 2,811,493; and 2,621,166); hydroxyl methyl-terminated perfluoromethylenes (U.S. Patents 2,911,390 and 2,902,473); polyalkyleneether triols (U.S. Patent 2,866,774; Belgian Patent 582,076); polyalkyleneether glycols (U.S. Patent 2,808,391; British Patent 733,624).

The

modified polymethylene polymers can be reduced to the corresponding HO— polymers with lithium aluminum hydride.

The modified polymethylenes containing side-chain CN groups exhibit increased solvent resistance, the higher the CN content the greater the resistance to swelling. The CN groups can be catalytically hydrogenated with a metal catalyst in the presence of ammonium to obtain the corresponding —CH$_2$—NH$_2$ group.

Significant modification in the polymer properties can occur even when only a small proportion of side-chain groups bearing oxygen, nitrogen, of sulfur atoms is present. For example, when there is, on the average, less than 0.1 amino group per 100 chain-carbon atoms, the modified polymethylene will exhibit increased retention of dyes and other compounds which can form salts therewith. When a very small proportion of substituents bearing Zerewitinoff active hydrogen atoms, for example, hydroxyl, mercapto, carboxyl, or amino groups are present, the modified polymethylene can be reacted with monomeric polyisocyanates and NCO-terminated polyurethanes for chain-extension, cross-linking, and the formation of block copolymers.

The modified polymethylenes of the present invention can be cured by a wide variety of procedures whose selection depends upon the nature of the substituents in the side-chain. Polymers containing carbon-carbon double bonds as cure sites can be cured by the sulfur recipes familiar to those skilled in the art. These polymers containing no double bonds can be cured by free radical reagents such as dicumyl peroxide with or without radical traps. Polymers containing hydroxyl groups can be cured by esterification with dibasic acid (carboxylic, sulfonic, phosphonic, and the like), and by reaction with polyisocyanates. Polymers containing amino functions can be cured as follows: primary and secondary amines—salts and amides of dibasic acids; coupling with organic dihalides; coordination with polyvalent methyl ions; reaction with diisocyanates. Primary amino groups can also be reacted with dialdehydes and diketones. Tertiary amines—salt formation with basic acids; coordination with metal ions; and formation of diquaternary compounds with organic dihalides. Polymers containing reactive halogens, for example

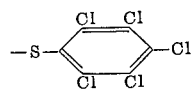

by reaction with diamines. Elastomers containing SH groups: by oxidative coupling to an —S—S— link.

What is claimed is:

1. A chain-saturated ethylene copolymer comprising monomer units of (I) ethylene, (II) 5-bromo-1-pentene or 5-bromo-1-hexene units, (III) units of a non-conjugated hydrocarbon diene of from 6 to 22 carbon atoms, and (IV) units of a monomer of the formula CH$_2$=CH—A wherein A is a side-chain radical selected from the group consisting of:

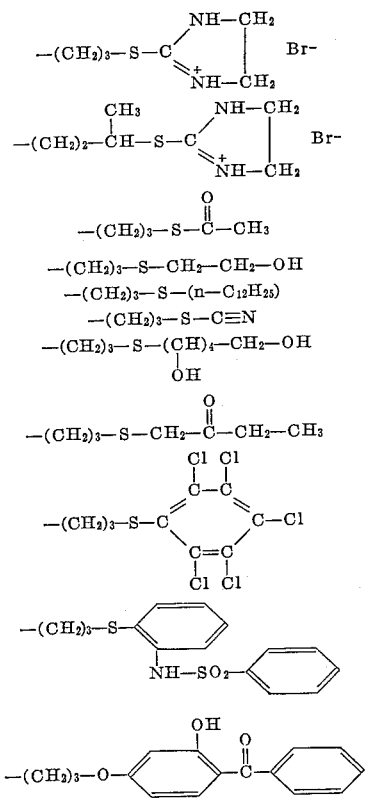

the copolymer containing the following number of side chains per 100 chain carbon atoms; up to about 1.7 side chains from the diene units (III), up to about 7 side chains from the bromine-containing monomer units (II), and about 2 to 8.2 side chains from the CH$_2$=CH—A units (IV).

2. A copolymer according to claim 1 wherein said side-chain radicals A have the structure $$-CH_2-CH_2-CH_2-S-C\begin{pmatrix}NH-CH_2\\ \overset{+}{N}H-CH_2\end{pmatrix}\quad Br^-$$

3. A copolymer according to claim 1 wherein said side-chain radicals A have the structure $$-CH_2-CH_2-\underset{CH_3}{CH}-S-C\begin{pmatrix}NH-CH_2\\ \overset{+}{N}H-CH_2\end{pmatrix}\quad Br^-$$

4. A copolymer according to claim 1 wherein said side-chain radicals A have the structure $$-CH_2-CH_2-CH_2-S-\underset{O}{\overset{\parallel}{C}}-CH_3$$

5. A copolymer according to claim 1 wherein said side-chain radicals A have the structure $$-CH_2-CH_2-CH_2-S-CH_2-CH_2-OH$$

6. A copolymer according to claim 1 wherein said side-chain radicals A have the structure $$-CH_2-CH_2-CH_2-S-(n-C_{12}H_{25})$$

7. A copolymer according to claim 1 wherein said side-chain radicals A have the structure $$-CH_2-CH_2-CH_2-S-C\equiv N$$

8. A copolymer according to claim 1 wherein said side-chain radicals A have the structure $$-CH_2-CH_2-CH_2-S-\left(\underset{OH}{CH}\right)_4-CH_2OH$$

9. A copolymer according to claim 1 wherein said side-chain radicals A have the structure $$-CH_2-CH_2-CH_2-S-CH_2-\underset{O}{\overset{\parallel}{C}}-CH_2-CH_3$$

10. A copolymer according to claim 1 wherein said side-chain radicals A have the structure $$-CH_2-CH_2-CH_2-S-C\begin{pmatrix}\overset{Cl}{C}=\overset{Cl}{C}\\ C=C\\ \underset{Cl}{\phantom{C}}\,\underset{Cl}{\phantom{C}}\end{pmatrix}C-Cl$$

11. A copolymer according to claim 1 wherein said side-chain radicals A have the structure $$-CH_2-CH_2-CH_2-S-\underset{NH-SO_2-\phi}{\phi}$$

12. A copolymer according to claim 1 wherein said side-chain radicals A have the structure $$-CH_2-CH_2-CH_2-S-$$

and wherein the sulfur atom of each radical is joined to the sulfur atom of another of said radicals.

13. A copolymer according to claim 1 wherein said side chain radicals A have the structure $$-(CH_2)_3-O-\phi(OH)-\overset{O}{\overset{\parallel}{C}}-\phi$$

References Cited by the Examiner

UNITED STATES PATENTS

| | | | |
|---|---|---|---|
| 2,947,731 | 8/1960 | Nummy | 260—79.7 |
| 2,979,488 | 4/1961 | Carpenter | 260—79.5 |
| 3,206,400 | 9/1965 | Flowers | 260—79.7 X |
| 3,179,638 | 4/1965 | Shashoua | 260—79.7 |

JOSEPH L. SCHOFER, *Primary Examiner.*

LEON J. BERCOVITZ, *Examiner.*

M. HENDRICKSON, D. K. DENENBERG,
*Assistant Examiners.*